US012553510B2

(12) United States Patent
Kosht et al.

(10) Patent No.: US 12,553,510 B2
(45) Date of Patent: Feb. 17, 2026

(54) BELT DRIVE SYSTEM

(71) Applicant: INTELLIGRATED HEADQUARTERS, LLC, Mason, OH (US)

(72) Inventors: Danial Lewis Kosht, Charlotte, NC (US); Kishor Mujumdar, Charlotte, NC (US); Ralf Buerkle, Charlotte, NC (US); Gregory M. Sanders, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 18/786,015

(22) Filed: Jul. 26, 2024

(65) Prior Publication Data

US 2025/0052312 A1  Feb. 13, 2025

(30) Foreign Application Priority Data

Aug. 10, 2023 (IN) .............................. 202311053677

(51) Int. Cl.
*F16H 57/031* (2012.01)
(52) U.S. Cl.
CPC .................................. *F16H 57/031* (2013.01)
(58) Field of Classification Search
CPC ... F16P 1/02; F16H 57/035; F16H 2007/0865
USPC .................................................. 474/144, 146
See application file for complete search history.

(56) References Cited

U.S. PATENT DOCUMENTS

| 3,693,297 | A | * | 9/1972 | Cann | ........................ | B24B 47/12 |
| | | | | | | 451/239 |
| 3,927,578 | A | * | 12/1975 | Mattila | ...................... | F16P 1/02 |
| | | | | | | 474/146 |
| 5,473,310 | A | * | 12/1995 | Ko | .......................... | G08B 13/08 |
| | | | | | | 340/529 |
| 5,698,796 | A | | 12/1997 | Hirano | | |

(Continued)

FOREIGN PATENT DOCUMENTS

| CN | 204828612 U | 12/2015 |
| CN | 207183840 U | 4/2018 |

(Continued)

OTHER PUBLICATIONS

Extended European Search Report Mailed on Apr. 7, 2025 for EP Application No. 24191182, 10 page(s).

*Primary Examiner* — Anna M Momper
*Assistant Examiner* — Mark K Buse
(74) *Attorney, Agent, or Firm* — Alston & Bird LLP

(57) ABSTRACT

A belt drive system includes a housing, a first pulley and a second pulley rotatably disposed in the housing, a belt that connects the first pulley with the second pulley, where the first pulley drives the second pulley via the belt. The belt drive system includes a cover rotatably coupled to the housing with a rotating mechanism, such that the cover is moved between a closed position and an open position with respect to the housing. The belt drive system also includes safety device having an actuating element mounted on the cover and a projection unit mounted within the housing to provide a first caution based on a proximity of the actuating element with respect to the projection unit, where the first caution is indicative of a movement of the cover from the closed position.

15 Claims, 8 Drawing Sheets

(56) References Cited

U.S. PATENT DOCUMENTS

| | | | | |
|---|---|---|---|---|
| 5,957,796 | A * | 9/1999 | McLean | F04B 53/16 |
| | | | | 417/313 |
| 7,094,169 | B2 * | 8/2006 | Weinstein | B26D 7/2614 |
| | | | | 474/140 |
| 7,874,951 | B2 * | 1/2011 | Leiss | F04B 17/06 |
| | | | | 474/146 |
| 9,464,697 | B2 * | 10/2016 | Antchak | F16H 7/12 |
| 2003/0083803 | A1 * | 5/2003 | Serkh | F16H 7/14 |
| | | | | 123/195 A |
| 2005/0009653 | A1 * | 1/2005 | Weinstein | B26D 7/22 |
| | | | | 474/144 |
| 2010/0033325 | A1 * | 2/2010 | Vilkomirski | B25H 3/02 |
| | | | | 340/540 |
| 2014/0309882 | A1 | 10/2014 | Antchak et al. | |
| 2019/0177089 | A1 * | 6/2019 | Benefield | E05C 19/166 |
| 2019/0308095 | A1 * | 10/2019 | Jones | A63F 3/00157 |
| 2020/0270886 | A1 * | 8/2020 | Guilfoyle | A61H 33/6005 |
| 2021/0364079 | A1 * | 11/2021 | Dabade | F16H 57/035 |
| 2023/0417418 | A1 * | 12/2023 | Cowan | F24C 15/02 |

FOREIGN PATENT DOCUMENTS

| | | |
|---|---|---|
| CN | 211140578 U | 7/2020 |
| CN | 217539553 U | 10/2022 |
| DE | 102008002304 A1 | 12/2009 |
| JP | 2019-139152 A | 8/2019 |
| KR | 10-2043965 B1 | 12/2019 |
| TW | M608177 U | 2/2021 |

* cited by examiner

BELT DRIVE SYSTEM

CROSS-REFERENCE TO RELATED APPLICATIONS

This application claims priority pursuant to 35 U.S.C. 119(a) to Indian Application No. 202311053677, filed Aug. 10, 2023, which application is incorporated herein by reference in its entirety.

TECHNOLOGICAL FIELD

The present disclosure generally relates to a belt drive system, and more particularly relates to a safety mechanism for the belt drive system to prevent safety accidents to an operator.

BACKGROUND

Material handling equipment, such as conveyers, typically includes multiple rotating components, such as pulleys, driven by a driving member, such as a belt or a chain. A constant motion of the drive member during operation of the equipment a high risk of safety accidents to operators working at the equipment. Current day material handling equipment employs a guard to cover the rotating components, thereby ensuring some safety to the operators. However, during installation process and/or commissioning, the guard is removed from the equipment and placed away from the equipment. Owing to a challenge in differentiating operating state and non-operating state of the rotating components and the driving member, the equipment made free from the guard may pose risk to the operators working at the equipment and may be prone to injuries.

BRIEF SUMMARY

According to an exemplary embodiment of the present disclosure, a drive system is provided. The drive system includes a housing, at least one driving pulley rotatably disposed in the housing, and at least one driven pulley rotatably disposed in the housing, and an endless drive member that connects the at least one driving pulley with the at least one driven pulley. The at least one driving pulley drives the at least one driven pulley via the endless drive member. The drive system includes a cover coupled to the housing with a rotating mechanism, such that the cover is rotatable about the rotating mechanism from a closed position to an open position, where the cover restricts access to components of the housing in the closed position and allows access to components of the housing in the open position. The drive system includes an indicator unit mounted within the housing to provide an indication in response to movement of the cover from the closed position.

In an embodiment, the endless drive member is one of a belt or a chain. In an embodiment, the rotating mechanism includes at least one hinge.

In an embodiment, the cover is retained in the closed position by at least one fastener. In an embodiment, the at least one fastener unfastens the cover from the housing upon adequate rotation, such as at least a quarter rotation, of an unfastening tool.

In an embodiment, the cover has a window to allow viewing the components of the housing in the closed position thereof.

In an embodiment, the indicator unit is at least one of a visual indicator and an audio indicator. In an embodiment, the indication provided by the indication unit is an image light to form an image of caution.

In an embodiment, the indicator unit comprises a plurality of light-emitting diodes (LEDs). In an embodiment, the plurality of LEDs is actuated to illuminate in response to movement of the cover from the closed position. In an embodiment, the plurality of LEDs may illuminate for a predefined time interval in response to movement of the cover from the closed position.

According to another exemplary embodiment of the present disclosure, a belt drive system is provided. The belt drive system includes a housing, a first pulley rotatably disposed in the housing, a second pulley rotatably disposed in the housing, and a belt that connects the first pulley with the second pulley, where the first pulley drives the second pulley via the belt. The belt drive system includes a plunger coupled to the housing and configured to strike on the belt when actuated. The belt drive system also includes a cover coupled to the housing and provided to rotate from a closed position to an open position with respect to the housing. The cover restricts access to components of the housing in the closed position and allows access to components of the housing in the open position and defines a cutout and an aperture. A portion of the plunger is received in the cutout in the closed position of the cover, and the aperture is configured to allow insertion of a sensing portion of a belt tension meter therethrough to determine tension in the belt.

In an embodiment, the belt drive system further includes a projection unit mounted within the housing to provide a first caution in response to movement of the cover from the closed position.

In an embodiment, the belt drive system further includes an actuating element mounted on an inner surface of the cover. The projection unit provides the first caution based on a proximity of the actuating element with respect to the projection unit, where the first caution is indicative of the movement of the cover from the closed position.

In an embodiment, the belt drive system further includes a first rotatable shaft to receive the first pulley thereon and a second rotatable shaft to receive the second pulley thereon. The housing at least partially receives the first rotatable shaft and the second rotatable shaft therein.

In an embodiment, the belt drive system further includes at least one display element attached to an end of each of the first rotatable shaft and the second rotatable shaft, where the at least one display element provides a second caution indicative of a rotatable condition of the first rotatable shaft and the second rotatable shaft. In an embodiment, the at least one display element includes a visually detectable design having a shape of one of, but is not limited to, a spiral, G-swirl, horseshoes, hurricane, apostrophe, comma, wobbly ball, wobbly moon.

According to yet another exemplary embodiment of the present disclosure, a method of indicating a working state of a belt drive system is provided. The method includes receiving, by a controller, a first input from a magnetic field sensing element that is located in a projection unit mounted in a housing of the belt drive system. The magnetic field sensing element generates the first input in response to sensing presence of a magnetic element within a proximal range of the projection unit, where the magnetic element is mounted on a cover of the belt drive system. The method includes receiving, by the controller, a second input from an accelerometer sensor, where the second input is indicative of the working state of the belt drive system. The method also includes regulating, by the controller, supply of power to the projection unit based on the first input and the second input, where the projection unit provides a caution.

In an embodiment, the method further includes regulating, by the controller, the supply of power to the projection unit to provide the caution when the magnetic element is proximal to the projection unit and the working state of the drive system is ON (as determined by the operational vibration level exceeding predefined limits).

According to yet another exemplary embodiment of the present disclosure, a belt drive system is provided. The belt drive system includes a housing, a first pulley rotatably disposed in the housing, a second pulley rotatably disposed in the housing, and a belt that connects the first pulley with the second pulley, where the first pulley drives the second pulley via the belt. The belt drive system includes a cover coupled to the housing with a rotating mechanism such that the cover is rotatable about the rotating mechanism from a closed position to an open position. The cover restricts access to components of the housing in the closed position and allows access to components of the housing in the open position. The belt drive system includes a safety device to provide a caution. The safety device includes an actuating element mounted on the cover and a projection unit mounted within the housing. The projection unit provides a first caution based on a proximity of the actuating element with respect to the projection unit, where the first caution is indicative of a movement of the cover from the closed position.

In an embodiment, the projection unit provides the first caution in response to the actuating element being moved beyond a proximal range of the projection unit. In an embodiment, the first caution is an image light to form an image of caution.

In an embodiment, the actuating element is a magnetic field generating unit. In an embodiment, the magnetic field generating unit is one of a permanent magnet or an electromagnet.

In an embodiment, the proximal range is defined based on strength of magnetic field generated by the magnetic field generating unit. In an embodiment, the projection unit comprises a magnetic field sensing element configured to provide the first caution based on presence of magnetic field.

In an embodiment, the safety device further includes a controller to regulate supply of power to the projection unit based on the proximity of the actuating element with respect to the projection unit and actuate the projection unit to provide the first caution.

In an embodiment, the safety device further includes an accelerometer sensor to generate a signal based on a working state of the belt drive system. The controller is communicably coupled to the accelerometer sensor and regulates supply of power to the projection unit based on: (i) the proximity of the actuating element with respect to the projection unit and (ii) the signal received from the accelerometer sensor. In an embodiment, the controller actuates the projection unit to provide the first caution when the actuating element is away from the projection unit and the working state of the belt drive system is ON.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Embodiments of the present disclosure are described more fully hereinafter with reference to the accompanying drawings, in which some, but not all, embodiments are shown. Indeed, various embodiments may be embodied in many different forms and should not be construed as limited to the embodiments set forth herein. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa. Like numbers refer to like elements throughout.

The components illustrated in the figures represent components that may or may not be present in various embodiments of the present disclosure described herein, such that embodiments may include fewer or more components than those shown in the figures while not departing from the scope of the present disclosure.

The phrases "in an embodiment," "in some embodiments," "according to one embodiment," and the like generally mean that the particular feature, structure, or characteristic following the phrase may be included in at least one embodiment of the present disclosure or may be included in more than one embodiment of the present disclosure (importantly, such phrases do not necessarily refer to the same embodiment).

Figure 1:
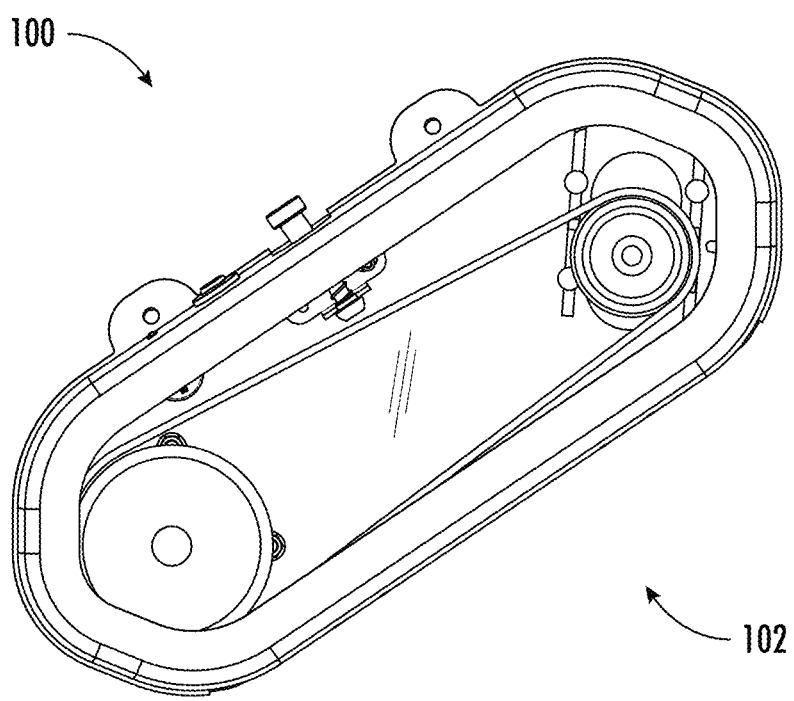
FIG. 1 is an exemplary belt drive system, according to an embodiment of the present disclosure.
Figure 2:
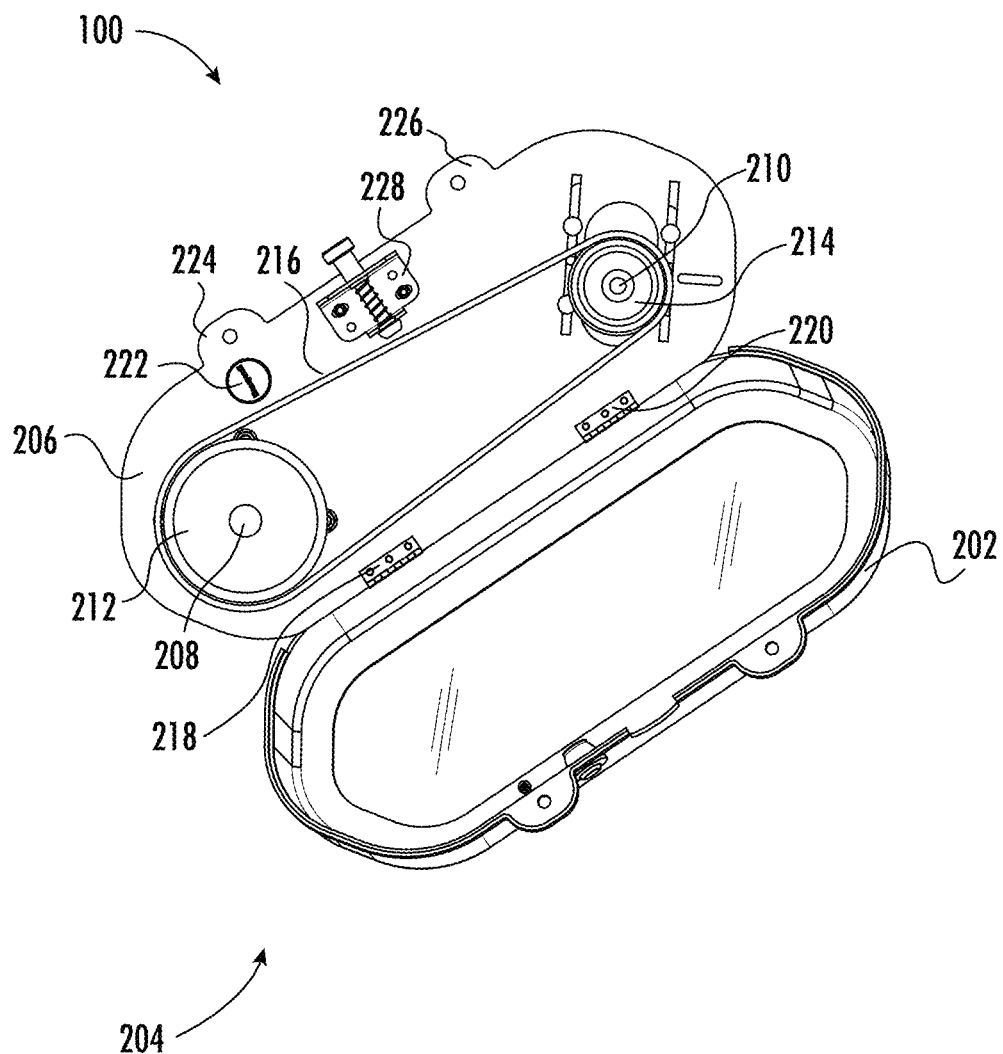
FIG. 2 illustrates an open position of a cover of the belt drive system of FIG. 1, according to an embodiment of the present disclosure.

FIG. 1 illustrates an exemplary belt drive system 100 and FIG. 2 illustrates a cover 202 rotated to an open position 204, according to embodiments of the present disclosure. The belt drive system 100 is alternatively referred to as a "drive system" in the present disclosure, which is commonly hereinafter referred to as "the system 100". Referring to FIG. 2, the system 100 includes a housing 206, a first rotatable shaft 208, a second rotatable shaft 210, at least one driving pulley 212 rotatably disposed in the housing 206, at least one driven pulley 214 rotatably disposed in the housing 206, and an endless drive member 216 configured to connect the at least one driving pulley 212 with the at least one driven pulley 214. The housing 206 is configured to receive the first rotatable shaft 208 and the second rotatable shaft 210 at least partially. One end of each of the first rotatable shaft 208 and the second rotatable shaft 210 are seen in FIG. 2 and the other end each of the first rotatable shaft 208 and the second rotatable shaft 210 may be coupled to, for example, work extraction apparatus. As used herein, the term "work extraction apparatus" may include any apparatus or system or assembly which is configured to operate based on rotational power of the first rotatable shaft 208 and the second rotatable shaft 210. As such, a portion of each of the first rotatable shaft 208 and the second rotatable shaft 210 is received within the housing 206. Hence, such a condition is referred to as "at least partially received" in the present disclosure.

Hereinafter, the driving pulley 212 is referred to as "the first pulley 212", the driven pulley 214 is referred to as "the second pulley 214", and the endless drive member 216 is a belt and referred to as "the belt 216". In other embodiments, the endless drive member 216 may be implemented as a chain albeit with few variations to structure of components and arrangements described herein. The first rotatable shaft 208 is configured to receive the first pulley 212 thereon and the second rotatable shaft 210 is configured to receive the second pulley 214 thereon. The first pulley 212 is configured to drive the second pulley 214 via the belt 216. It will be understood that, to achieve a required rotational speed at the second pulley 214 (or, at the second rotatable shaft 210), diameters of the first pulley 212 and the second pulley 214 may be different. For example, a ratio of the diameter of the first pulley 212 to the diameter of the second pulley 214 may help achieve a required rotational speed at the second pulley 214 (or, at the second rotatable shaft 210). Additionally, multiple first pulleys 212 and multiple second pulleys 214 may be rotatably disposed within the housing 206. As such, housing 206 may be understood as a casing configured to house multiple components of the system 100. Other combinations and configurations of the pulley and belt arrangement, known to one skilled in the art, are included in scope of the present disclosure. In an aspect, the term "endless drive member" also includes a chain drive. As such, systems implementing the chain drive includes sprockets and are applicable as alternatives or equivalents in scope of the present disclosure. In another aspect, the housing 206 may be configured to house multiple components of any power transmission system. In another aspect, the system 100 may be implemented in, for example, but is not limited to, a conveyer assembly, a lawn mower, or any other system that involves at least one rotating component (such as, pulley or sprocket), a portion of a drive member (such as, belt or chain) disposed around the rotating component, and a cover used to conceal the rotating component and the drive member.

The cover 202 is illustrated in the open position 204 in FIG. 2 and in a closed position 102 in FIG. 1. As illustrated in FIG. 2, the cover 202 is coupled to the housing 206 via a rotating mechanism to allow rotation or swivel movement of the cover 202 from the closed position 102 to the open position 204. In the illustrated embodiment, the rotating mechanism includes a first hinge 218 and a second hinge 220. The cover 202 restricts access to components of the housing 206 in the closed position 102 and allows access to components of the housing 206 in the open position 204. In an embodiment, the cover 202 may be coupled to the housing 206 with one long hinge (not shown). In some embodiments, any other rotatable joints configured to allow rotational or swivel movement of one component with respect to other component may be used.

The system 100 includes an indicator unit 222 mounted within the housing 206 and configured to provide an indication in response to movement of the cover 202 from the closed position 102. In an embodiment, the indicator unit 222 may be implemented as any unit or a device capable of providing an alert or an indication based on an input thereto. In another embodiment, the indicator unit 222 is at least one of a visual indicator and an audio indicator. Based on the environment in which the system 100 is implemented or employed, the indicator unit 222 may be configured to provide an audio alert having a decibel range greater than a surrounding noise, but below a human safe threshold of 80 dB. According to an aspect of the present disclosure, the indicator unit 222 includes a plurality of light-emitting diodes (LEDs), for example an array for LEDs. In an embodiment, the plurality of LEDs is actuated to either illuminate continuously or intermittently in response to movement of the cover 202 from the closed position 102. In an aspect, a visible range of the plurality of LEDs is up to 3 meters. However, based on number of LEDs, intensity, and wattage rating of the LEDs, the visible range may vary. In an embodiment, the indication provided by the indicator unit 222 is an image light to form an image of caution. When the indicator unit 222 is configured to provide both the visual indication and the audio indication, the indication may be in form of the image of caution along with the audio indication. The LEDs project the light to form the image of caution and hence the indicator unit 222 is alternatively referred to as "the projection unit 222" in the present disclosure. The projection unit 222 is configured to provide a first caution to an operator.

Figure 3A:
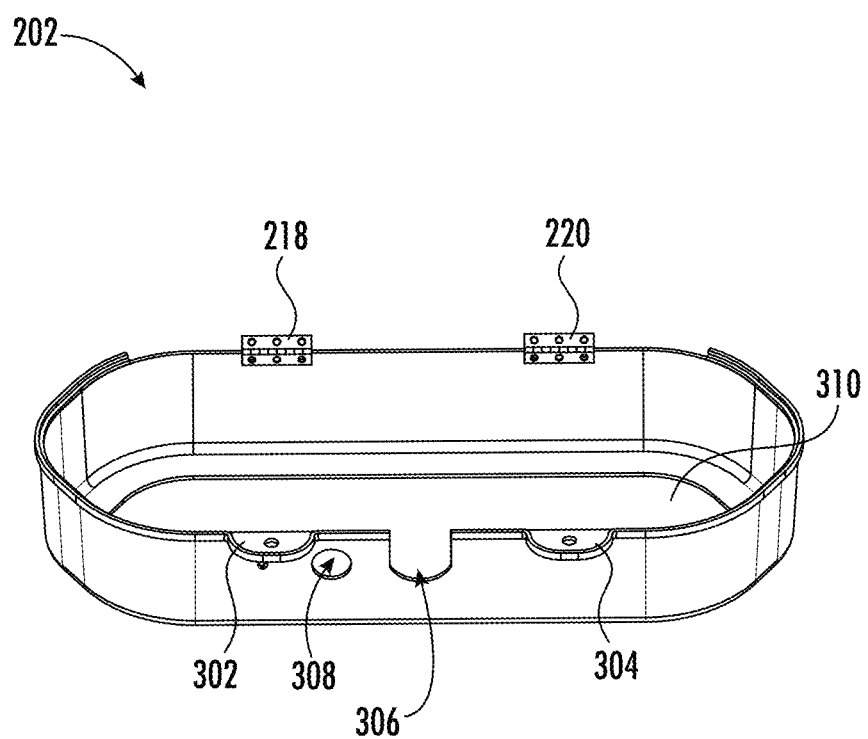
FIG. 3A is a perspective view of the cover, according to an embodiment of the present disclosure.

FIG. 3A illustrates a perspective view of the cover 202, according to an embodiment of the present disclosure. The first hinge 218 and the second hinge 220 are attached to one side of the cover 202, and an opposite side of the cover 202 includes a first lug 302 and a second lug 304. A shape of the cover 202 corresponds to a shape of the housing 206, such that the cover 202 can conceal a periphery of the housing 206. Each of the first lug 302 and the second lug 304 defines a hole configured to receive a fastener (not shown) therethrough. The housing 206 includes a first attachment portion 224 and a second attachment portion 226 configured to abut the first lug 302 and the second lug 304, respectively, in the closed position 102 of the cover 202. As such, the first attachment portion 224 and the second attachment portion 226 are provided at locations corresponding to location of the first lug 302 and the second lug 304, respectively, when the cover 202 is in the closed position 102. Each of the first attachment portion 224 and the second attachment portion 226 defines a hole that aligns with a corresponding hole defined in the first lug 302 and the second lug 304, such that the fastener may be received through respective holes. With the aid of the fasteners, the cover 202 may be retained in the closed position 102. In an embodiment, the fasteners are configured to unfasten the cover 202 from the housing 206 with at least a quarter rotation of an unfastening tool. In an aspect, a minimum number of fasteners, such as screws, may be used to reduce an overall time required to unfasten the cover 202 from the housing 206. Further, the cover 202 defines a cutout 306 and an aperture 308.

Figure 3B:
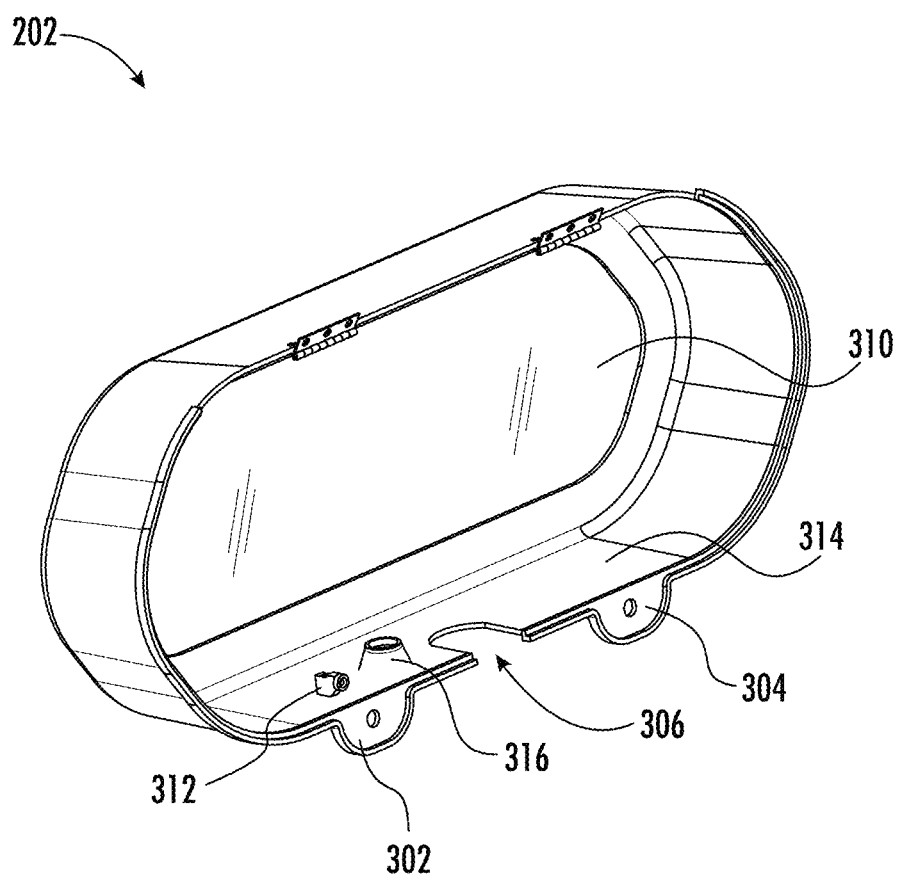
FIG. 3B is another perspective view of the cover, according to an embodiment of the present disclosure.

FIG. 3B illustrates another perspective view of the cover 202, according to an embodiment of the present disclosure. The cover 202 includes a window 310 configured to allow viewing the components of the housing 206 in the closed position 102 thereof. In an embodiment, the aperture 308 may be covered by a grommet 316 to prevent ingress of dust or any other particle into the housing 206 in the closed position 102 of the cover 202. The system 100 further includes an actuating element 312 mounted on an inner surface 314 of the cover 202, as shown in FIG. 3B. In some embodiments, the actuating element 312 may be mounted at any suitable location on the cover 202. In an embodiment, the actuating element 312 is a magnetic field generating unit and may be implemented as one of a permanent magnet or an electromagnet. In cases where the actuating element 312 is embodied as the electromagnet, the inner surface 314 of the cover 202 may also house a power source, such a battery, to energize the electromagnet. In the closed position 102 of the cover 202, the actuating element 312 is located proximal to the projection unit 222 of the housing 206.

Figure 4:
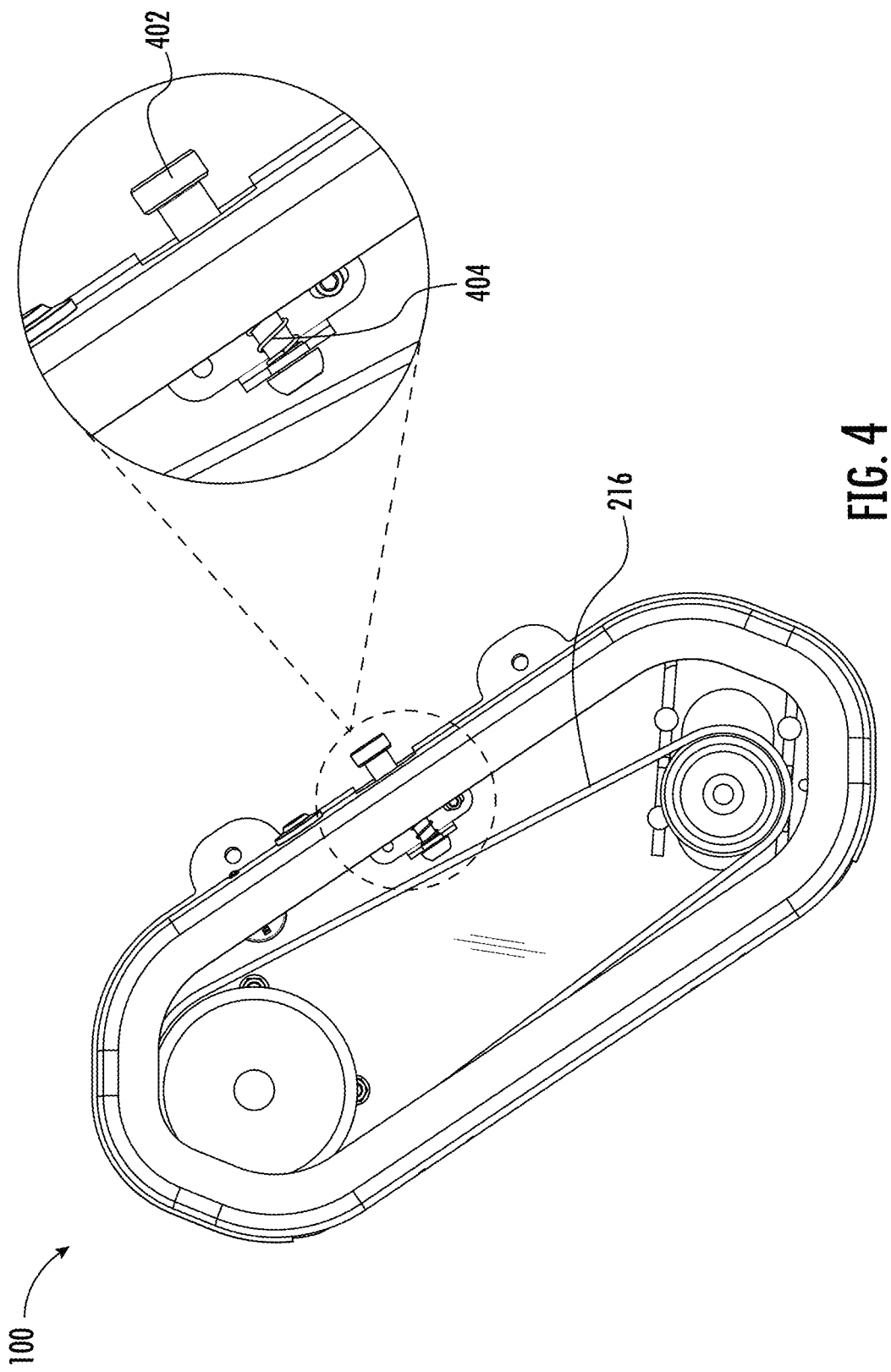
FIG. 4 illustrates a plunger of the belt drive system, according to an embodiment of the present disclosure.

FIG. 4 illustrates another perspective view of the system 100, according to an embodiment of the present disclosure. The system 100 includes a plunger 402 attached to the housing 206 with help of one of more fixtures 228 (see FIG. 2). The plunger 402 is configured to strike on the belt 216 when actuated. A spring 404 biases the plunger 402 in an outward direction with respect to the housing 206, where one end of the plunger 402 is accessible to the operator and an opposite end of the plunger 402 is proximal to the belt 216. Upon application of force, the plunger 402 is configured to move inward and strike the belt 216. However, owing to the biasing force of the spring 404, the plunger 402 retracts to an initial position. The cutout 306 is defined in the cover 202 at a location corresponding to a location of the plunger 402, such that a portion of the plunger 402 that extends outside the housing 206 is received in the cutout 306 when the cover 202 is in the closed position 102. As used herein, the phrase "received in the cutout 306" refers to an arrangement where a periphery of the cutout 306 surrounds the portion of the plunger 402 that extends outside the housing 206. In an aspect, in the closed position 102 of the cover 202, the cutout 306 abuts a surface of the one or more fixtures 228 and helps prevent ingress of dust into the housing 206. The aperture 308 defined in the cover 202 is configured to allow insertion of a sensing portion of a belt tension meter (not shown) therethrough to determine tension in the belt 216. In some embodiments, the aperture 308 may be defined in the housing 206 at a location proximal to the plunger 402.

Figure 5:
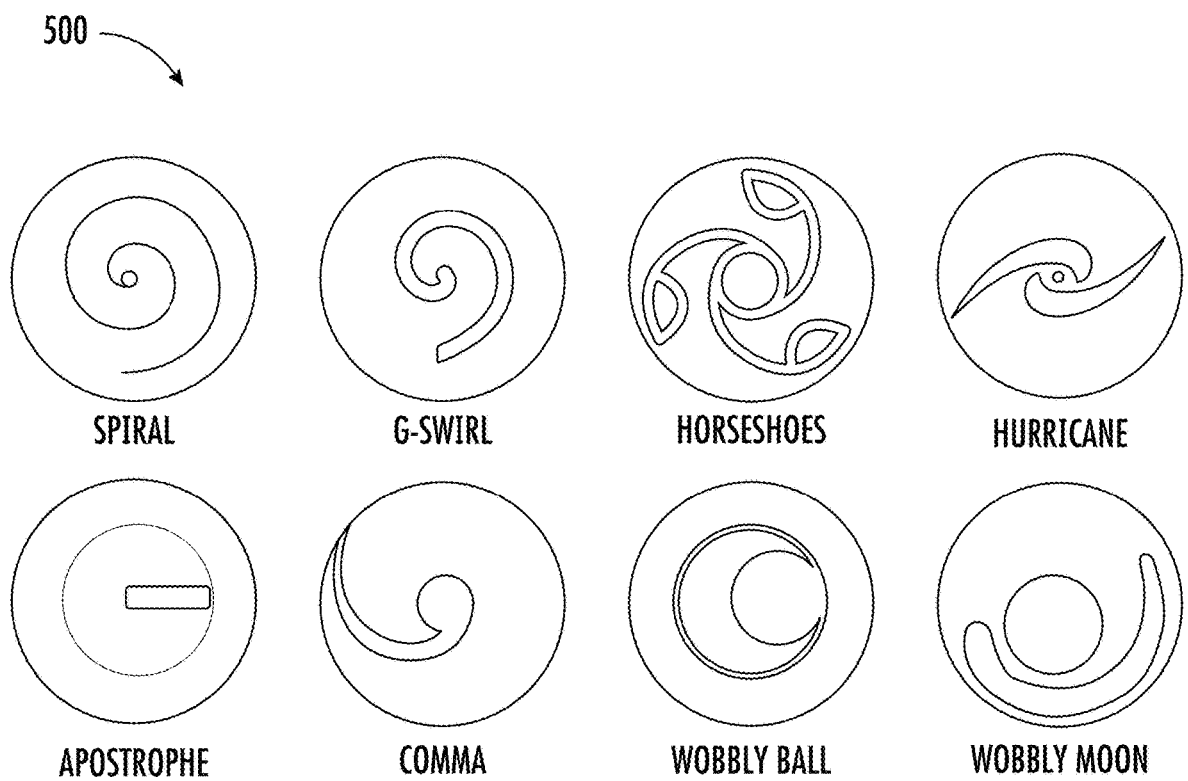
FIG. 5 illustrates display elements of the belt drive system, according to an embodiment of the present disclosure.

One end of each of the first rotatable shaft 208 and the second rotatable shaft 210 is seen through the window 310 of the cover 202 in FIG. 4. In an embodiment, the system 100 further includes at least one display element 500 attached to the end of each of the first rotatable shaft 208 and the second rotatable shaft 210. The at least one display element 500 is configured to provide a second caution indicative of a rotatable condition of the first rotatable shaft 208 and the second rotatable shaft 210. In an example, the display element 500 may be an image formed by paint, a plastic cover, or a sticker. As illustrated in FIG. 5, the display element 500 includes a visually detectable design having a shape of one of, but is not limited to, a spiral, G-swirl, horseshoes, hurricane, apostrophe, comma, wobbly ball, wobbly moon. In an embodiment, the display element 500 may be, for example, colored, non-colored, or illuminated.

Figure 6:
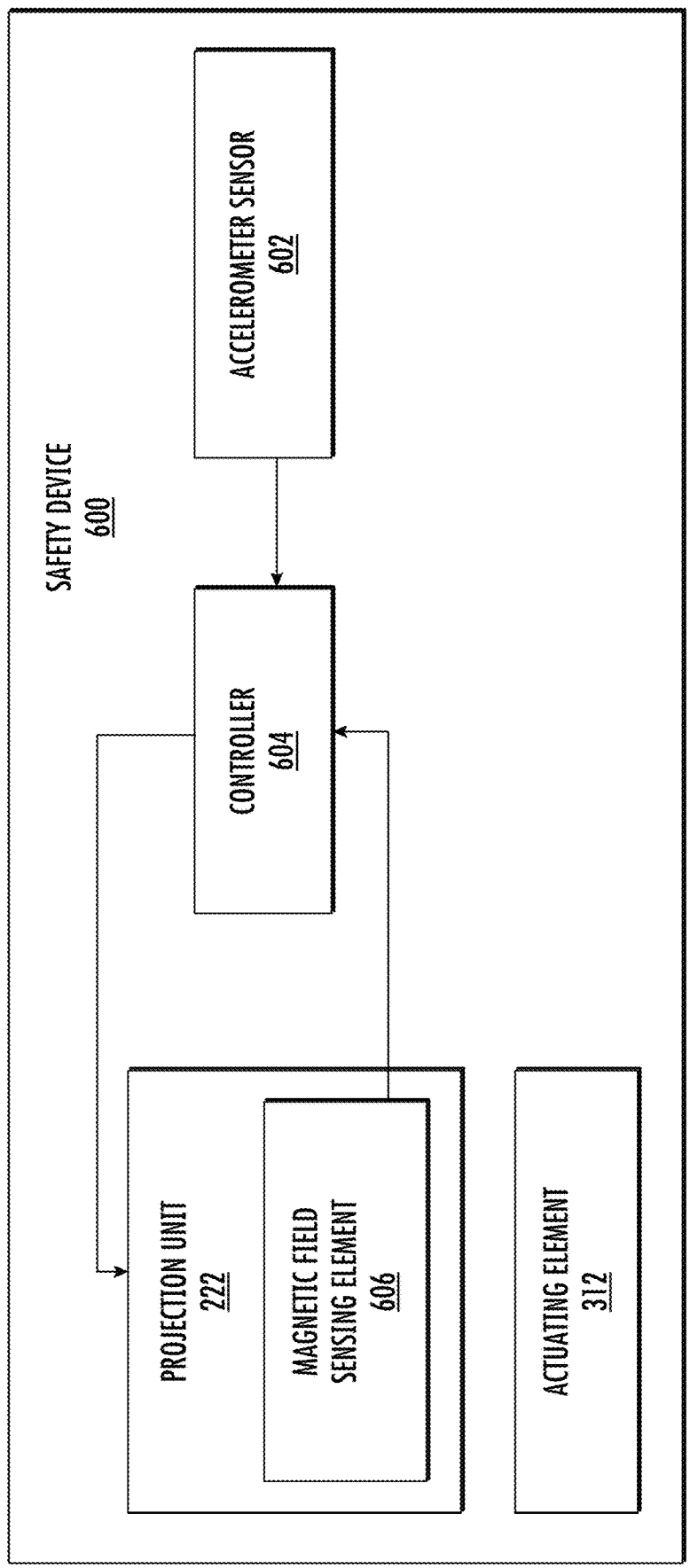
FIG. 6 is a block diagram of a safety device of the belt drive system, according to an embodiment of the present disclosure.

FIG. 6 is a block diagram of a safety device 600 of the system 100, according to an embodiment of the present disclosure, and is described in conjunction with FIG. 1 through FIG. 5. The safety device 600 is configured to provide the caution to the operator. The safety device 600 includes the projection unit 222 mounted within the housing 206, the actuating element 312 mounted on the inner surface 314 of the cover 202, an accelerometer sensor 602, and a controller 604 communicably coupled to each of the projection unit 222 and the accelerometer sensor 602. In an embodiment, the projection unit 222 includes a magnetic field sensing element 606 configured to provide the first caution. In some embodiments, the controller 604 may be implemented as one or more processors that are configured to execute instructions stored in a memory (for example, random-access memory (RAM), read only memory (ROM), hard disk, optical disc, subscriber identity module (SIM) card, memory stick, secure digital (SD) memory card, on-processor cache, and the like). Alternatively, the controller 604 may be implemented using dedicated circuitry, such as a programmed field-programmable gate array (FPGA), a graphical processing unit (GPU), or an application-specific integrated circuit (ASIC). In some embodiments, the controller 604 may include a memory (not shown) to store information. In some embodiments, the controller 604 may be a programmable logic control (PLC). In other embodiments, the controller 604 may be configured to receive inputs, process the inputs, and provide an output, where the output, for example, may include, but not limited to, actuating one or more components of the system 100.

In operation, the projection unit 222 is configured to provide the first caution based on a proximity of the actuating element 312 with respect to the projection unit 222. Since the actuating element 312 is implemented as the magnetic field generating unit, the magnetic field sensing element 606 is configured to sense the proximity of the actuating element 312 and provide the first caution based on presence of magnetic field. In particular, the projection unit 222 is configured to provide the first caution in response to the actuating element 312 being moved beyond a proximal range of the projection unit 222. As such, the first caution is indicative of a movement of the cover 202 from the closed position 102. In an aspect, the proximal range is defined based on strength of magnetic field generated by the magnetic field generating unit. Until the magnetic field sensing element 606 senses the presence of magnetic field generated by the actuating element 312, the projection unit 222 does not provide the first caution. At an instance where the cover 202 is moved from the closed position 102, the actuating element 312 is moved away from a sensing region of the magnetic field sensing element 606. In response to the actuating element 312 being moved beyond the proximal range, the projection unit 222 is actuated. That is, in response to the movement of the cover 202, the plurality of LEDs illuminates. In some embodiments, the first caution may be an image of caution which is easily perceivable by the operator. In some embodiments, the plurality of LEDs may illuminate for a predetermined time period, for example 120 seconds. On expiry of the predetermined time interval, the projection unit 222 may be configured to provide an audio alert to move the cover 202 to the closed position 102. In some embodiments, the projection unit 222 may include beacon lights.

In an embodiment, the controller 604 is configured to regulate supply of power (such as, electrical power) to the projection unit 222 based on the proximity of the actuating element 312 with respect to the projection unit 222, and thereby actuate the projection unit 222 to provide the first caution. For the purpose, the controller 604 is configured to receive a first input from the magnetic field sensing element 606 indicative of presence or absence of the actuating element 312 within the proximal range. In an embodiment, a value of the first input generated by the magnetic field sensing element 606 may be indicative of the presence or absence of the actuating element 312 within the proximal range. The controller 604 may be configured to determine such presence or absence based on the value of the first input. In some embodiments, the controller 604 may be configured to regulate supply of power to the projection unit 222 based on an energized state of rotating members, such as the first rotatable shaft 208 and the second rotatable shaft 210. As used herein, the term "energized state" includes conditions where the first rotatable shaft 208 and the second rotatable shaft 210 are actuated for rotation. For example, each of the first rotatable shaft 208 and the second rotatable shaft 210 may be part of individual motors and an electrical supply provided to such motors to switch on the motors and initiate rotation of the first rotatable shaft 208 and the second rotatable shaft 210 may be considered as "energized state".

In an embodiment, the accelerometer sensor 602 is configured to generate a second input (alternatively referred to as "the signal" in the present disclosure) based on a working state of the system 100. In an example, the accelerometer sensor 602 may be configured to sense rotation of at least one of the first pulley 212 and the second pulley 214, or movement of the belt 216 and accordingly generate the second input. A value of the second input may be indicative of the working state of the system 100. The controller 604 is configured to regulate supply of power (such as, electrical power) to the projection unit 222 based on the values of the first input and the second input. In particular, the controller 604 is configured to actuate the projection unit 222 to provide the first caution when the actuating element 312 is away from the projection unit 222 and the working state of the system 100 is ON. In some embodiments, separate batteries may be used to power the projection unit 222.

According to an aspect of the present disclosure, the safety device 600 may be provided as a safety and/or caution kit that includes the components thereof described herein. The actuating element 312, the projection unit 222, the accelerometer sensor 602, the controller 604 may all be packed together with a manual to constitute the safety and/or caution kit. The manual may instruct the operator to assemble these components on any belt drive system, so as to function in a manner described herein. The controller 604, as would be appreciated by the person skilled in the art, may be a microcontroller and may be operably paired with the projection unit 222, the magnetic field sensing element 606, and the accelerometer sensor 602, so that the safety and/or caution kit, when assembled, does not require additional efforts by the operator. These components of the safety device 600 may be disposed on the system 100 with help of adhesives, such as a double-sided tape.

To this end, the present disclosure provides an efficient safety device 600 for the system 100 to caution and alert the operator and therefore avoid any safety accidents to the operator. Owing to the presence of the display element 500 on the end of the rotating shafts, the operator is notified regarding the operating state of the system 100 and hence alerts the operator from accessing the components of the housing 206 for performing any maintenance activity. The presence of hinges 218, 220 on the cover 202 help retain the cover 202 attached to the housing 206 when the cover 202 is moved to the open position 204. As such, the cover 202 is evidently noticed at the system 100 and adds to the caution provided by the display element 500. Since the projection unit 222 is actuated when the system is ON and as soon as the cover 202 is moved from the closed position and, the operator is made aware of the safety hazard and alerts the operator from accessing the components of the housing 206 for performing any maintenance activity. The projection unit 222 may also alert the operator when the cover 202 is not properly closed on the housing 206. Owing to the illumination of the LEDs or beacon light of the projection unit 222, the operator may be additionally cautioned regarding the operating state of the system 100. Further, fasteners are configured to allow the cover 202 to be unfastened with a quarter rotation of the unfastening tool, thereby reducing overall time required to move the cover 202 from the closed position and fasten the cover 202 back to the housing 206, which otherwise required more time considering the number of fasteners, latches, and the like. The aperture 308 defined in the cover 202 allows for determining the tension in the belt 216 without disturbing the cover 202, thereby enhancing safety of the operator.

Figure 7:
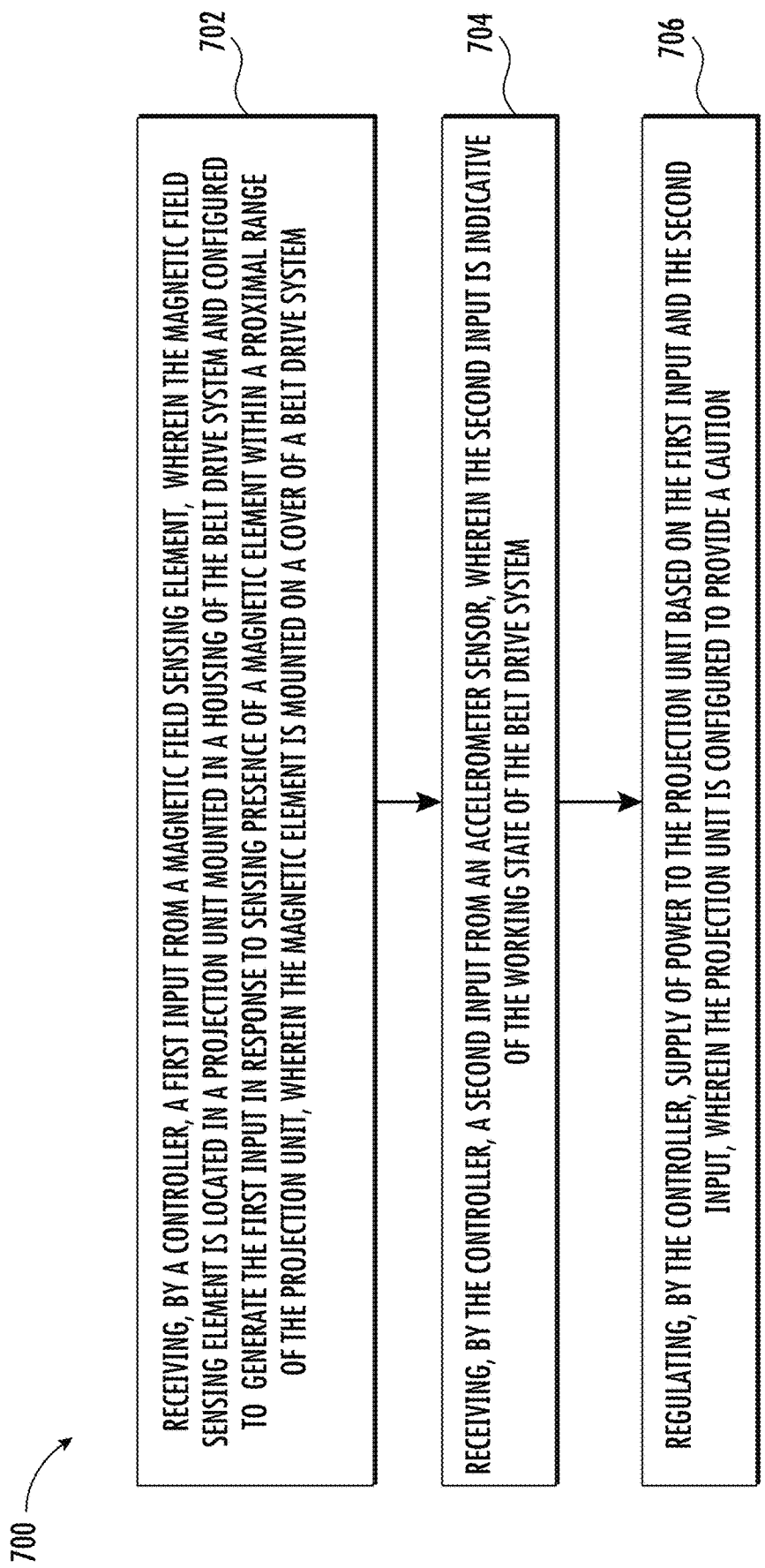
FIG. 7 is a flowchart of a method of indicating a working state of a belt drive system, according to an aspect of the present disclosure.

FIG. 7 is a flowchart of a method 700 of indicating a working state of the system 100, according to an aspect of the present disclosure, and is described in conjunction with FIG. 1 through FIG. 6. At step 702, the method 700 includes receiving, by the controller 604, the first input from the magnetic field sensing element 606, where the first input is generated in response to sensing presence of a magnetic element (such as the actuating element 312) within the proximal range of the projection unit 222, where the magnetic element is mounted on the cover 202.

At step 704, the method 700 includes receiving, by the controller 604, the second input from the accelerometer sensor 602, where the second input is indicative of the working state of the system 100.

At step 706, the method 700 includes regulating, by the controller 604, supply of power to the projection unit 222 based on the first input and the second input, where the projection unit 222 is configured to provide the caution. In an embodiment, method 700 includes regulating, by the controller 604, the supply of power to the projection unit 222 to provide the caution when the magnetic element is proximal to the projection unit 222 and the working state of the system 100 is ON.

The foregoing method descriptions and the process flow diagrams are provided merely as illustrative examples and are not intended to require or imply that the steps of the various embodiments must be performed in the order presented. As will be appreciated by one of skilled in the art, the order of steps in the foregoing embodiments may be performed in any order. Any reference to claim elements in the singular, for example, using the articles "a," "an" or "the" is not to be construed as limiting the element to the singular.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (for example, "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Many modifications and other embodiments of the inventions set forth herein will come to mind to one skilled in the art to which these inventions pertain having the benefit of teachings presented in the foregoing descriptions and the associated drawings. Although the figures only show certain components of the system described herein, it is understood that various other components may be present. Therefore, it is to be understood that the present disclosure should not be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A drive system comprising:
    a housing;
    at least one driving pulley rotatably disposed in the housing;
    at least one driven pulley rotatably disposed in the housing;
    an endless drive member configured to connect the at least one driving pulley with the at least one driven pulley, wherein the at least one driving pulley drives the at least one driven pulley via the endless drive member;
    a cover coupled to the housing with a rotating mechanism, wherein the cover is rotatable about the rotating mechanism from a closed position to an open position, and wherein the cover restricts access to components of the housing in the closed position and allows access to the components of the housing in the open position;
    an indicator unit mounted within the housing and configured to provide an indication in response to a movement of the cover from the closed position;
    a magnetic field sensing element mounted in the housing of the drive system and configured to generate a first input in response to sensing presence of a magnetic element beyond a proximal range of the indicator unit, wherein the first input indicates the movement of the cover from the closed position to the open position;
    an accelerometer sensor configured to sense a rotation of at least one of the at least one driving pulley and the at least one driven pulley to generate the second input; and
    the indicator unit within the housing is configured to provide a caution based on the first input and the second input.

2. The drive system of claim 1, wherein the endless drive member is one of a belt or a chain.

3. The drive system of claim 1, wherein the rotating mechanism comprises at least one hinge.

4. The drive system of claim 1, wherein the cover is retained in the closed position by at least one fastener.

5. The drive system of claim 4, wherein the at least one fastener is configured to unfasten the cover from the housing with at least a quarter rotation of an unfastening tool.

6. The drive system of claim 1, wherein the cover comprises a window configured to allow viewing the components of the housing in the closed position thereof.

7. A belt drive system comprising:
    a housing;
    a first pulley rotatably disposed in the housing;
    a second pulley rotatably disposed in the housing;
    a belt configured to connect the first pulley with the second pulley, wherein the first pulley drives the second pulley via the belt;
    a plunger coupled to the housing and configured to strike on the belt when actuated upon application of force; and
    a cover coupled to the housing and configured to rotate from a closed position to an open position with respect to the housing, the cover restricts access to components of the housing in the closed position and allows the access to components of the housing in the open position, wherein the cover defines a cutout at a location corresponding to a location of the plunger and an aperture,
    wherein a portion of the plunger is received in the cutout when the cover is in the closed position,
    wherein the aperture is configured to allow insertion of a sensing portion of a belt tension meter therethrough to determine tension in the belt;
    a projection unit mounted within the housing and configured to provide an indication in response to a movement of the cover from the closed position;
    a magnetic field sensing element mounted in the housing of the belt drive system and configured to generate a first input in response to sensing presence of a magnetic element beyond a proximal range of the projection unit, wherein the first input is indicative of the movement of the cover from the closed position to the open position;
    an accelerometer sensor configured to sense a rotation of at least one of the first pulley and the second pulley to generate the second input; and
    the projection unit within the housing is configured to provide a caution based on the first input and the second input.

8. The belt drive system of claim 7, wherein the projection unit mounted within the housing and configured to provide a first caution in response to the movement of the cover from the closed position.

9. The belt drive system of claim 8 further comprising an actuating element mounted on an inner surface of the cover, wherein the projection unit is configured to provide the first caution based on a proximity of the actuating element with respect to the projection unit, wherein the first caution is indicative of the movement of the cover from the closed position.

10. The belt drive system of claim 7 further comprising:
   a first rotatable shaft configured to receive the first pulley thereon; and
   a second rotatable shaft configured to receive the second pulley thereon,
   wherein the housing is configured to at least partially receive the first rotatable shaft and the second rotatable shaft therein.

11. The belt drive system of claim 10 further comprising at least one display element attached to an end of each of the first rotatable shaft and the second rotatable shaft, wherein the at least one display element is configured to provide a second caution indicative of a rotatable condition of the first rotatable shaft and the second rotatable shaft.

12. A method of indicating a working state of a belt drive system, the method comprising:
   receiving, by a controller, a first input from a magnetic field sensing element, wherein the magnetic field sensing element is located in a projection unit mounted in a housing of the belt drive system and configured to generate the first input in response to sensing presence of a magnetic element within a proximal range of the projection unit, wherein the magnetic element is mounted on a cover of the belt drive system;
   receiving, by the controller, a second input from an accelerometer sensor, wherein the second input is indicative of the working state of the belt drive system; and
   regulating, by the controller, supply of power to the projection unit based on the first input and the second input, wherein the projection unit is configured to provide a caution.

13. The method of claim 12 further comprising regulating, by the controller, the supply of power to the projection unit to provide the caution when the magnetic element is beyond the proximal range to the projection unit and the working state of the belt drive system is ON.

14. A belt drive system comprising:
   a housing;
   a first pulley rotatably disposed in the housing;
   a second pulley rotatably disposed in the housing;
   a belt configured to connect the first pulley with the second pulley, wherein the first pulley drives the second pulley via the belt;
   a cover coupled to the housing with a rotating mechanism, wherein the cover is rotatable about the rotating mechanism from a closed position to an open position, and wherein the cover restricts access to components of the housing in the closed position and allows the access to the components of the housing in the open position; and
   a safety device configured to provide a caution, the safety device comprising:
      an actuating element mounted on the cover;
      a projection unit mounted within the housing and configured to provide an indication in response to a movement of the cover from the closed position;
      a magnetic field sensing element configured to generate a first input in response to sensing presence of the actuating element beyond a proximal range of the projection unit, wherein the first input is indicative of the movement of the cover from the closed position to the open position;
      an accelerometer sensor configured to sense rotation of at least one of the first pulley and the second pulley to generate the second input; and
      the projection unit is configured to provide the caution based on the first input and the second input.

15. The belt drive system of claim 14, wherein the projection unit is configured to provide a first caution in response to the actuating element being moved beyond the proximal range of the projection unit.

* * * * *